United States Patent [19]
Montagne

[11] 3,841,377
[45] Oct. 15, 1974

[54] RADIAL TIRE HAVING BEAD STIFFENER OF CROSSED STEEL CORDS

[75] Inventor: Jean Bernard Montagne, Cebazat, France

[73] Assignee: Compagnie Generale Des Establissements Michelin, raison sociale Michelin & Cie, Clermont-Ferrand, France

[22] Filed: Mar. 8, 1973

[21] Appl. No.: 339,361

[30] Foreign Application Priority Data
Mar. 9, 1972  France ............................. 72.8332

[52] U.S. Cl. .......................................... 152/362 CS
[51] Int. Cl. ............................................ B60c 15/06
[58] Field of Search ................... 152/362 R, 362 CS

[56] References Cited
UNITED STATES PATENTS
2,820,500  1/1958  Dickerson ..................... 152/362 CS
3,302,681  2/1967  Travers .......................... 152/362 R
3,557,860  1/1971  Maiocchi ....................... 152/362 R FOREIGN PATENTS OR APPLICATIONS
970,772  9/1964  Great Britain ................. 152/362 R Primary Examiner—M. Henson Wood, Jr.
Assistant Examiner—George H. Libman
Attorney, Agent, or Firm—Brumbaugh, Graves, Donohue & Raymond

[57] ABSTRACT

Each bead of a radial tire has a single bead ring and a stiffener of steel cords arranged on the outside of the carcass. Each stiffener comprises at least two layers of crossed cords extending between a point located radially beyond the end of the carcass and a point located along the base of the bead.

7 Claims, 4 Drawing Figures

RADIAL TIRE HAVING BEAD STIFFENER OF CROSSED STEEL CORDS

BACKGROUND OF THE INVENTION

This invention relates to tires and, more particularly, to radial tires for heavy vehicles having novel and highly-effective bead reinforcements.

The reinforcement of a bead of a radial tire for a heavy vehicle consists essentially of three elements: the carcass, the bead ring and the stiffener. Ordinarily these three elements have the following features:

a. The carcass comprises one or more plies of cords which, arranged in radial planes of the tire, surround the bead ring and extend up in the bead to a point above the edges of the rim. These cords may be of steel or textile fibers. In the latter case, in order to obtain sufficient strength, it is advisable in general to use a plurality of plies.

b. There is generally only one bead ring when there are not more than a few carcass plies. It may be either a braided bead ring of circular section formed of helically stranded steel wires or a so-called "package bead ring" formed of a bundle of polygonal cross-section of juxtaposed steel wires, or else a bead ring formed by wrapping a sheet metal strip. These braided bead rings, which are stronger and more flexible, are preferred when the base of the bead and the seat of the bead on the rim are of cylindrical or slightly conical shape. However, they are not used when the base of the bead and the seat of the bead on the rim have a strongly conical shape, being inclined, for instance, by an angle of 15° or more to the axis of the tire or wheel.

c. The stiffener is formed of a ply of steel cords forming an angle of 15° to 30° with the circumferential direction. It is arranged along the base and the outer wall of the bead and extends upward beyond the end of the carcass. This stiffener imparts to the bead sufficient rigidity to avoid movement or rubbing of the bead on the rim.

The bead reinforcement as just described leaves something to be desired from various points of view.

A first drawback relates to the use of a braided bead ring in the case of beads with strongly conical base which must be wedged on the bead seats which are also strongly conical. Braided bead rings produce greater strength for the same amount of metal. They are therefore in principle economically and technically preferable. However, they lack sufficient rigidity to lock the bead on its seat. One solution to this problem is disclosed in copending U.S. patent application of Daniel Lejeune Ser. No. 122,934, filed Mar. 10, 1971, for "Tire Having Bead Wires Tangent to One Another." It involves using a composite bead ring which is formed of three braided rings which are tangent in pairs. However, as can easily be seen, a solution permitting the use of a single braided bead ring would be economically preferable.

A second drawback is the imperfect locking of the carcass with respect to the bead ring. The excessive mobility of the carcass and in particular of its folded back portion results in less endurance than is desirable. Many heavy tires fail because of damage in the low region, that is to say, at the junction of the bead and the sidewall. Furthermore, the mobility of the low zone carcass can be increased by over-vulcanization of the bead under the influence of the heat liberated by the brake drums. The temperature of a brake drum may be several hundreds of degrees centigrade, and, in the absence of sufficient cooling or adequate insulation, the transmission of heat to the rim may cause substantial heating of the beads.

SUMMARY OF THE INVENTION

An object of the invention is to overcome the problems outlined above and in particular to provide a bead reinforcement which improves the seating ability of even a bead having a circular bead ring and which reduces the mobility of the carcass in a critical zone.

The foregoing and other objects are attained in accordance with the invention by the provision of a tire having in each bead a single bead ring, which may be a braided bead ring of circular section, a small number of carcass plies, possibly a single ply, having radially arranged cords wound around the bead ring, and a stiffener of steel cords arranged on the outside of the carcass. The tire is characterized in that the stiffener comprises at least two layers of crossed cords and extends between a point located radially beyond the end of the carcass and a point located along the toe edge of the bead.

In one embodiment, the stiffener is formed of a folded single ply the fold of which is located in the vicinity of the toe edge of the bead. In this case it comprises cords inclined by an angle of 10° to 30° to the circumferential direction, the cords on opposite sides of the fold being inclined in opposite directions with respect to the circumferential direction.

Preferably the two folds of the stiffener thus formed of a folded ply have unequal lengths: one has a length sufficient to extend beyond the end of the folded-back portion of the carcass, while the other has a length such that the portion extending along the base of the bead and the portion extending along the outer wall of the bead have approximately the same lengths. A stiffener formed of two layers of cords which are part of the same folded ply is more effective than one formed of two layers of cords arranged in the same manner but constituting two separate plies.

In another embodiment, the stiffener is formed of two separate and structurally different superimposed plies. One, which is longer, is composed of relatively small cords inclined at a large angle—for instance 10° to 30°—to the circumferential direction. The other, which is shorter, is composed of relatively thick cords inclined at a smaller angle—for instance 5° to 15°—to the circumferential direction.

In this case also a stiffener formed of two layers of crossed identical cords inclined by the same angle is less effective.

The presence of a more rigid stiffener adjacent the carcass and formed of crossed cords triangulated by the cords of the carcass has a twofold effect:

The first effect is to lock the bead ring in rotation. Even if the bead ring is of circular cross section, the assembly of triangulated cords interrupts the axial symmetry. Axial symmetry favors rotation of the bead wire around its neutral fiber. The stiffener of the invention operates in a manner similar to the auxiliary bead rings disclosed in the copending patent application identified above, with the difference that the carcass cooperates in the overall rigidity.

The second effect is to reduce in all cases the mobility of the carcass; the latter is held between two rigid structures which themselves are compressed against the rim by the inflation pressure. Its anchoring is thereby improved even in case of weakening of the connecting rubbers by fatigue, over-curing, reversion, oxidation, etc.

BRIEF DESCRIPTION OF THE DRAWING

A better understanding of the invention can be gained from a consideration of the following detailed description of the preferred embodiments thereof, in conjunction with the appended figures of the drawing, wherein.

DESCRIPTION OF THE PREFERRED EMBODIMENTS

In the three figures, identical parts have been designated by the same reference numbers.

Figure 1:
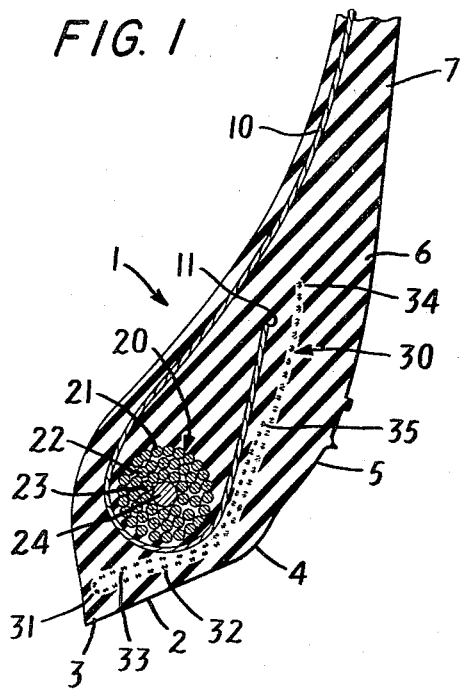
FIGS. 1 to 3 show in radial section three different embodiments of tire beads in accordance with the invention.
Figure 2:
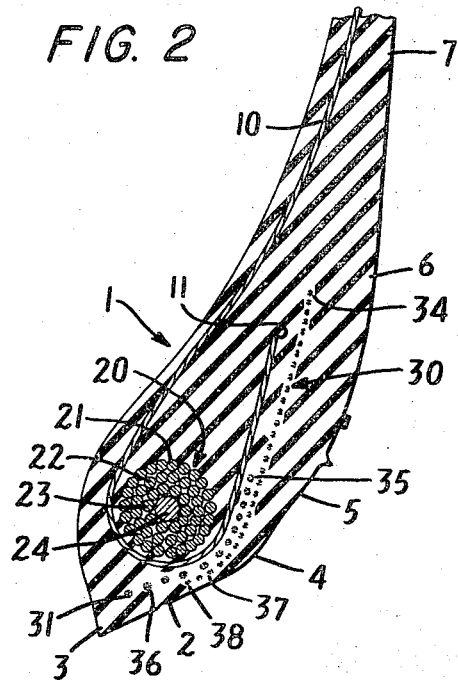
Figure 3:
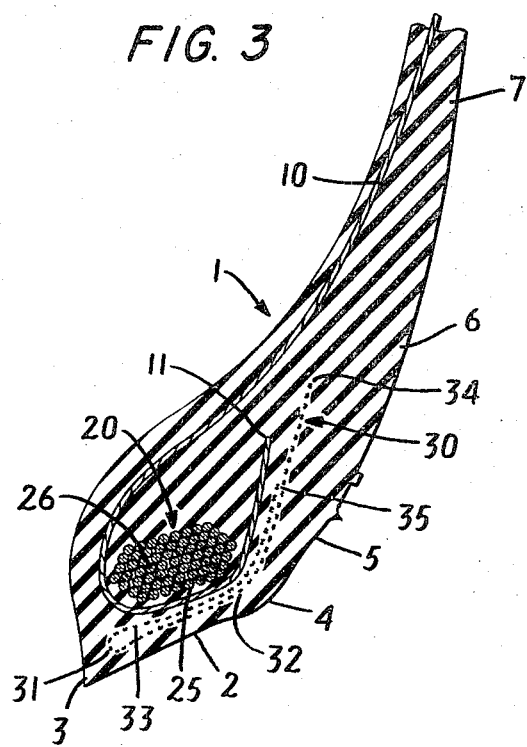

FIGS. 1-3 show a bead 1 whose base 2 extends between the bead toe edge 3 and the heel 4 and is inclined by an angle of about 15° to the axis of the tire. The outer wall of the bead has a portion 5 which is intended to come into contact with the rim. A portion 6 marks the transition between the bead 1 and the sidewall 7.

The first reinforcing element of the bead 1 is a carcass 10 which, in FIGS. 1-3, is formed of a single ply of steel cords arranged in radial planes of the tire. The ply 10 is folded back around the bead ring 20 and terminates at 11. Of course, the single ply 10 of steel cords could be replaced by several plies of cords of another material, oriented in the same manner.

Figure 4:
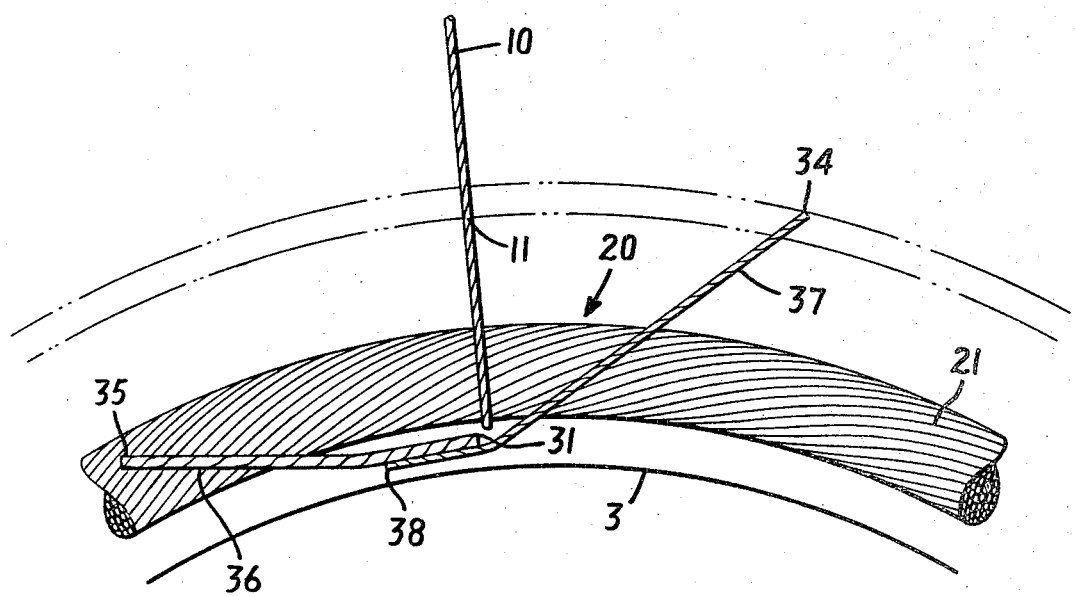
FIG. 4 shows the structure of FIG. 2 in side elevation, the elastomer being in phantom for clarity.

The second reinforcing element of the bead 1 is the bead ring 20. In the case of FIGS. 1, 2 and 4, the bead ring 20 is a braided bead ring of circular cross-section formed of a plurality of layers 21, 22, 23 of helically twisted metal wires arranged around a core 24. In the case of FIG. 3, the bead ring 20 is a package ring of hexagonal cross section whose base 25 is approximately parallel to the base 2 of the bead and which is formed of wires 26.

The third reinforcing element of the bead 1 is a stiffener 30. In the case of FIGS. 1 and 3, it comprises a single ply of steel cords folded at 31 near the toe edge 3 of the bead so as to form two layers 32 and 33, one terminating at 34 beyond the edge 11 of the carcass and the other at 35. In the case of FIGS. 2 and 4, the stiffener 30 comprises two separate plies 36 and 37, one, 36, being formed of relatively thick wires and the other, 37, of relatively small wires.

The ply 36 has its edges at 31 and 35 like the layer 33 of FIGS. 1 and 3. The ply 37 has one edge at 34 like the layer 32 of FIG. 1, and one edge at 38 about halfway between the toe edge 3 and the heel 4 of the bead.

In the region of the heel 4 of the bead, the carcass 10, the bead ring 20 and the stiffener 30 formed of its superimposed elements 32 and 33 or 36 and 37 are practically in contact with one another. The cords of the carcass 10 and those of the layers 32 and 33 or 36 and 37 are arranged along three different directions. The cords of the carcass make an angle of 90° with the circumferential direction. The cords of the plies 32 and 33 are inclined by an angle of 25° in opposite directions to the circumferential direction. Likewise, the cables of the plies 36 and 37 intersect, the cords of the ply 36 being inclined by an angle of 10° to the circumferential direction and those of the ply 37 by an angle of 25°.

A bead made in accordance with FIGS. 1 or 2 and 4 seats well and is stable on its bead seat, although the latter is inclined by an angle of 15° to the axis of the rim, and although a braided bead ring 20 of circular cross section is used. In the absence of one of the layers 32, 33, 36 or 37, the stability of the bead becomes precarious.

The behavior of the bead is substantially improved: in particular, under difficult conditions of use, for instance on an artificially heated test rim, the life of the bead is considerably improved. By way of comparison, during tests designed to be extremely severe for the tire, it is possible to increase the life of the tires of the invention by 60 percent as compared with tires of conventional type having simple stiffeners and package bead rings.

The embodiments described above are merely exemplary and are susceptible of many modifications within the spirit and scope of the invention. Accordingly, the invention is not limited except by the following claims.

I claim:

1. A tire comprising a carcass and a pair of beads each formed with a heel and a toe edge and, in each bead, a single bead ring, said carcass being formed of at least one ply comprising cords arranged in radial planes of the tire and folded outwardly around the bead ring in each bead, further comprising a stiffener of steel cords in each bead arranged on the outside of the carcass, each stiffener comprising at least two layers of crossed cords, extending between a point located radially beyond the end of the carcass and a point located along the base of the bead, and being spaced apart from the carcass and bead ring a minimum distance in the region of the heel of the bead.

2. A tire according to claim 1 wherein the stiffener in at least one bead is formed of a single folded ply the fold of which is adjacent the toe edge of the bead.

3. A tire according to claim 2 wherein the cords of the stiffener in said one bead are inclined by an angle of 10° to 30° to the circumferential direction.

4. A tire according to claim 2 wherein the stiffener in said one bead is folded asymmetrically into two portions, both of said portions extending over the entire portion of the bead that comes into contact with the rim of a wheel on which the tire is mounted and being in spaced-apart relation to the rim-contacting surface of the bead.

5. A tire comprising a carcass and a pair of beads and, in each bead, a single bead ring, said carcass being formed of a small number of plies, said plies comprising cords arranged in radial planes of the tire, further comprising a stiffener of steel cords in each bead arranged on the outside of the carcass, each stiffener comprising at least two layers of crossed cords and extending between a point located radially beyond the end of the carcass and a point located along the base of the bead wherein the stiffener in at least one bead is formed of two separate plies respectively formed of cords of different diameter and different inclination to the circumferential direction of the tire.

6. A tire according to claim 5 wherein one of the two plies is formed of cords which, as compared to the cords of the other ply, are of larger diameter and inclined with respect to the circumferential direction of the tire by a smaller angle.

7. A tire according to claim 6 wherein the ply formed of the larger-diameter cords is closer to the bead ring than is the other ply, extends only over the portion of the bead that comes into contact with the rim of a wheel on which the tire is mounted, and is in spaced-apart relation to the rim-contacting surface of the bead.

* * * * *